United States Patent [19]
Smith et al.

[11] 3,807,083
[45] Apr. 30, 1974

[54] INSECT EXTERMINATOR

[76] Inventors: Lonnie W. Smith, 9182 Loma St., Villa Park, Calif. 92267; Julius W. Reddoch, 1907 Ridgewood, Orange, Calif. 92665

[22] Filed: Oct. 4, 1972

[21] Appl. No.: 294,907

[52] U.S. Cl.................................. 43/138, 416/237
[51] Int. Cl............................................ A01m 5/02
[58] Field of Search ............ 43/138, 139, 132, 107; 416/237

[56] References Cited
UNITED STATES PATENTS

| | | | |
|---|---|---|---|
| 1,302,972 | 5/1919 | Rea....................................... | 43/139 |
| 1,036,331 | 8/1912 | Plumer................................. | 43/138 |
| 1,313,203 | 8/1919 | Pakeman .............................. | 43/139 |
| 201,650 | 3/1878 | Capern ................................. | 416/237 |
| 3,399,731 | 9/1968 | Giles, Jr............................... | 416/237 |

*Primary Examiner*—Louis G. Mancene
*Assistant Examiner*—Daniel J. Leach
*Attorney, Agent, or Firm*—Herzig & Walsh

[57] ABSTRACT

An insect exterminator having a motor driven rotor. Flies, moths, and other insects are attracted to the exterminator, preferably by a sprayed on scent or by a hot wire as a source of attracting heat. The rotor has a plurality of blades having a configuration to move through the air producing a laminar flow without turbulence whereby insects are attracted, but do not see the moving rotor and are not disturbed by turbulating air. Then, they are killed by the rotor. Preferably, the rotor blades have axially extending members which strike and kill the insects.

7 Claims, 6 Drawing Figures

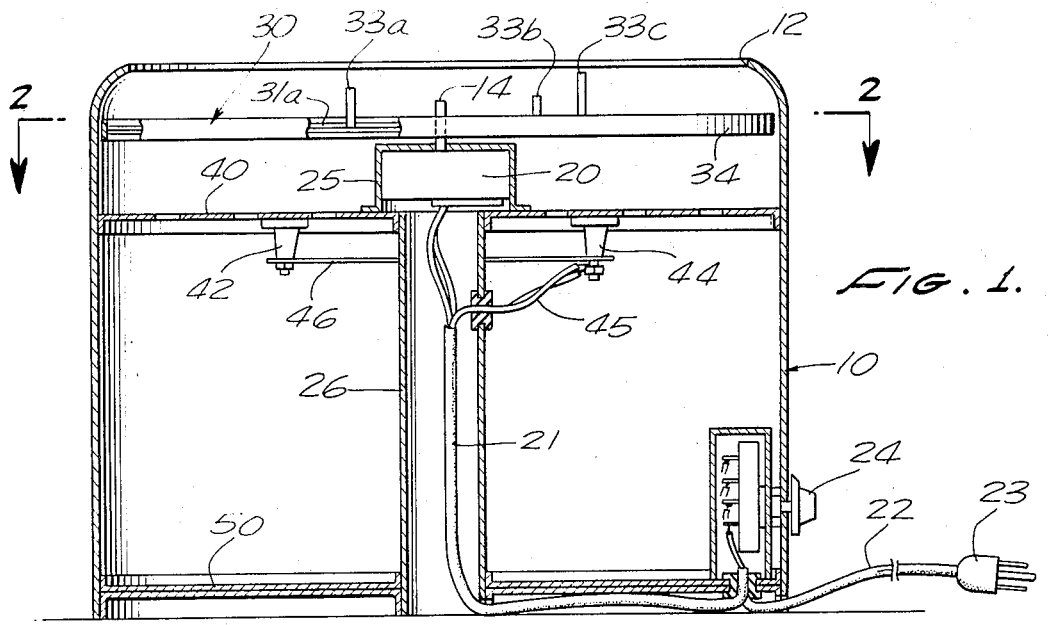
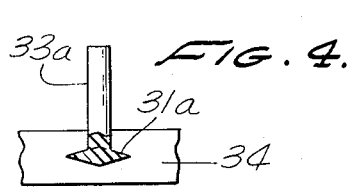
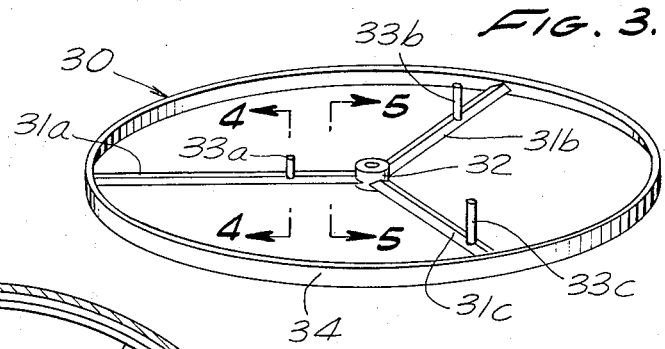
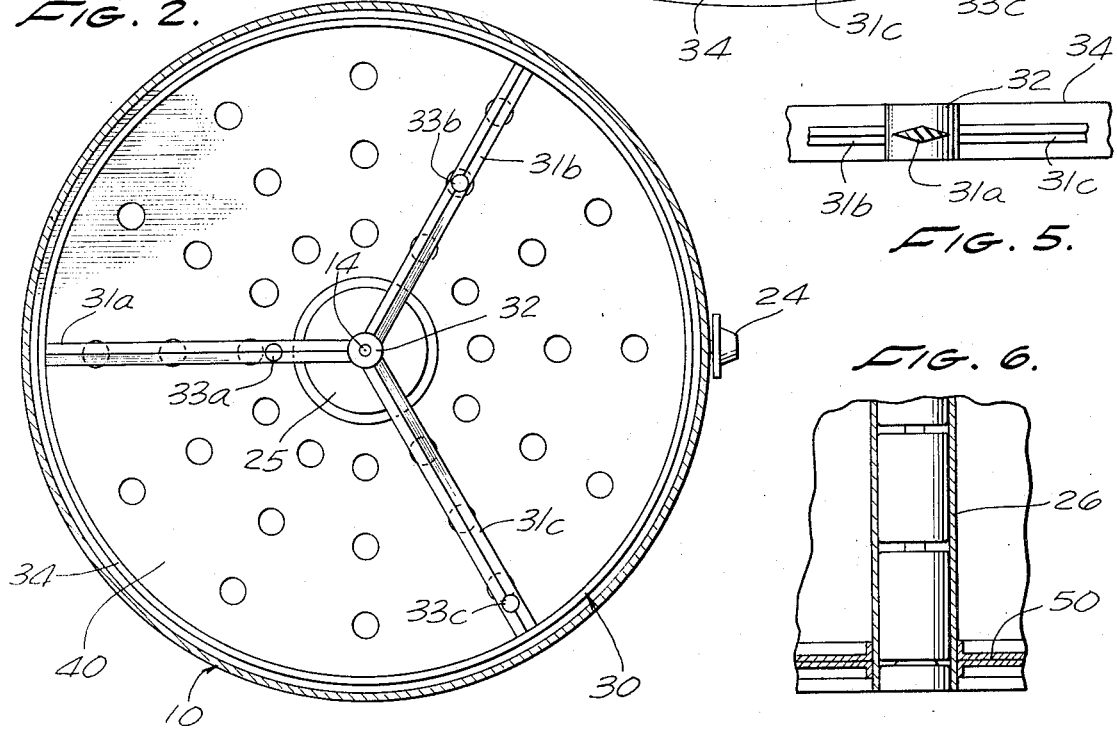
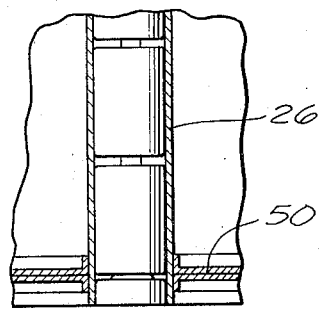

INSECT EXTERMINATOR

SUMMARY OF THE INVENTION

The invention is an insect exterminator capable of killing insects, particularly insects such as flies and moths, although it is adaptable and highly capable of exterminating many other different kinds of insects.

The presence of insects, for example, flies, in any given area is a nuisance and a hazard from various different standpoints, including those of of sanitation, health, convenience, etc. Effective extermination of insects has remained a problem, there being serious drawbacks to use of poisons, insecticides, pesticides, or electrically charged devices for this purpose.

The herein invention has as its primary object to provide an answer to the problem by way of a simple, highly effective, positive acting, and economical portable device for exterminating the insects. In a preferred form of the invention as described herein, it takes the form of a motor driven rotor having blades so configurated in cross section as to produce a laminar air flow, so as to not cause air turbulence. Means to attract the insects is provided, and this may be in the form of a hot wire heat source on one side of the rotor and/or a scent to attract them which may be sprayed on. The rotor construction is such that the speed at which it is driven, the blades are not visible to the insects. Because of the shape of the blades, there is no air turbulence to cause any effects which would distract or prevent the insects from approaching and attempting to pass through the rotor. In the preferred form of rotor, each rotor blade is provided with an axially extending member which assists in killing the insects which approach the rotor or attempt to pass through it. The device as described has been reduced to practice and has been found startlingly successful for its purpose of exterminating insects, particularly flies.

A further object is to realize an effective insect exterminator of this type characterized in that the motor driven rotor is constructed so that it is not visible to the insects, the blades of the rotor being so configurated as to not produce air turbulence which would distract the insects.

A further object is to realize an insect exterminator as in the foregoing, wherein the rotor blades have axially extending members positioned to assist in exterminating insects which approach or intend to fly through the rotor.

A further object is to provide a trap or exterminator as described wherein the means for attracting the insects may be in the form of a scent which is sprayed on using an aerosol can or they may be attracted by a source of heat provided by a hot wire.

BRIEF DESCRIPTION OF THE DRAWINGS

Further objects and additional advantages of the invention will be become apparent from the following detailed description and annexed drawings, wherein:

FIG. 1 is vertical section view of a preferred form of the invention;

FIG. 2 is a sectional view taken along line 2—2 of FIG. 1;

FIG. 3 is a perspective view of the rotor;

FIG. 4 is an elevational view, partly in section through one of the blade members, showing an upstanding prong which assists in killing the insects;

FIG. 5 is a sectional view taken along line 5—5 of FIG. 3; and

FIG. 6 is a partial view of a portable battery driven form of the invention.

DESCRIPTION OF THE PREFERRED EMBODIMENT

In the drawings, a preferred form of the invention is shown. Numeral 10 designates a generally cylindrical body having an upper opening as shown at 12. Numeral 14 designates a rotor shaft journaled in a suitable bearing. Shaft 14 is driven by a motor 20 which may be of a type to be plugged into an available power circuit or it may be battery driven with a battery provided in the unit, making it completely portable and usable in an area where a source of normal electrical power is unavailable. Numerals 21 and 22 designate power cords, the plug being shown at 23, control being by way of manual switch 24. Motor 20 is in housing 25 supported on tubular column or housing 26.

The rotor is designated generally at 30 and in the exemplary form of the invention shown, it has three blades as shown at 31a, 31b, and 31c which are alike and hub 32. Each blade has a cross section as shown at FIG. 3. The blades as shown are diamond shaped having relatively sharp leading and trailing edges as shown. See FIG. 2. This construction produces a laminar air flow which avoids any air turbulence that would tend to distract the insects or cause them to not approach the rotor or attempt to fly through it. The rotor is driven at a suitable speed so that the blades are not visible to the insects. In the exemplary form of the invention, the blades are relatively thin and fragile, rather than being massive, so that at a moderate driving speed, they are invisible to the insects. As shown, the rotor has a rim 34, although it can be constructed without a rim. Carried by blades 31a, 31b, and 31c are axial prongs 33a, 33b, and 33c which are preferably of different lengths and at different distances from the center of the rotor.

Preferably, the rotor is positioned below the top of body 10. Also, preferably, a protective grid, screen, or shield can be provided over the rotor to avoid accidental contact with it.

Numeral 40 designates a perforated surface member under the plane of the rotor. Means is provided in this area to attract the insects. The attracting means may be any one of various types of liquid scent which may be applied by an aerosol can to the surface to cause the insects to be attracted. Numerals 42 and 44 designated a pair of electrical terminals connected to cord 45 with a nichrome wire 46 extending between them which energizes the wire and generates sufficient heat to attract the insects. It has been well known in the art to use light emanating from light bulbs to attract insects. However, it has been discoverd that with respect to many types of insects, such as moths, it is a source of heat rather than light which is more apt to attract them. Actual bait such as sugar, honey, or other material, may be used rather than a scent to attract the insects, by placing it on surface 40.

Preferably, the container has appreciable depth providing space to receive the killed insects which fall through the perforations in the surface or platform 40 and onto a bottom wall member 50.

In the testing of the form of the invention which has been reduced to practice, it has been found to be extremely effective for its purpose of exterminating insects, particularly flies. It has been found that a relatively small model of the exterminator in the space of an hour will exterminate thousands of flies. The insects are attracted by the scent, bait, or heat source. Due to the speed of the rotor and the construction of its blades, the insects are attracted by the attracting source, do not see the rotor and are not disturbed by any turbulent air movement in the area of the attracting means. The result is that the insects are effectively exterminated by the rotor when they approach in its vicinity or attempt to fly through it. It is believed that the effectiveness of the exterminator stems from the particular attracting means which is used to attract the insects, the speed of the rotor, and the construction of its blades, whereby it is invisible and does not cause air turbulence in its vicinity. The prongs 33a, 33b, and 33c assist in killing insects in the region adjacent to the rotor blades. It should be understood that this combination of features can be embodied in variations of the invention other than the specific exemplary form shown in detail herein. The rotor might have more than three blades as shown. It is conceivable also that the rotor might be cylindrical in construction, rotating around a vertical or horizontal axis with the attracting means within the cylinder. Nevertheless, it will still have the characteristics built into it as described, rotating at a speed to be invisible to the insects. The blades or rotor elements would be in a construction so as to not cause air turbulence which would disturb or distract the insects flying adjacent the rotor or attempting to fly through it.

The foregoing disclosure is representative of a preferred form of the invention and is to be interpreted in an illustrative rather than a limiting sense, the invention to be accorded the full scope of the claims appended thereto.

What is claimed is:

1. An insect exterminator comprising, in combination: a shaft having rotor means thereon; motor means for driving the rotor whereby insects move past the moving rotor blades to be exterminated; and means positioned in proximity to the rotor whereby to attract insects in a manner such that they are contacted by parts of the rotor and killed thereby, said rotor means having blades constructed to provide for a laminar flow as the rotor rotates so as to avoid air turbulence in the vicinity of the rotor and the attracting means.

2. An exterminator as in claim 1, wherein each of said rotor blades has a cross section of substantial diamond shape.

3. An insect exterminator comprising, in combination: a shaft having rotor means thereon; motor means for driving the rotor, said rotor means having blades constructed to provide for a laminar flow as the rotor rotates so as to not produce air turbulence whereby insects move past the moving rotor blades to be exterminated; and means positioned in proximity to the rotor whereby to attract insects in a manner such that they are contacted by parts of the rotor and killed thereby, the attracting means comprising a source of heat positioned so that the insects will be attracted thereby to be exterminated by the rotor.

4. An exterminator as in claim 3, wherein said heat source is in the form of an electrical resistance wire.

5. An exterminator as in claim 3, wherein the attracting means comprises material having a scent which attracts insects that is sprayed onto surfaces whereby to cause the insects to be attracted to the rotor means.

6. An insect exterminator comprising, in combination: a shaft having rotor means thereon; motor means for driving the rotor, said rotor means having blades constructed to provide for a laminar flow as the rotor rotates so as to not produce air turbulence whereby insects move past the moving rotor blades to be exterminated; and means positioned in proximity to the rotor whereby to attract insects in a manner such that they are contacted by parts of the rotor and killed thereby, including a rigid member extending axially from each of said blades of the rotor in a position to contact insects attracted by the attracting means.

7. An exterminator as in claim 6, wherein said rigid members are of different lengths and are at different distances from the center of the rotor.

* * * * *